(No Model.) 4 Sheets—Sheet 1.
W. C. FLETCHER.
ELECTRIC ELEVATOR MOTOR.
No. 530,032. Patented Nov. 27, 1894.
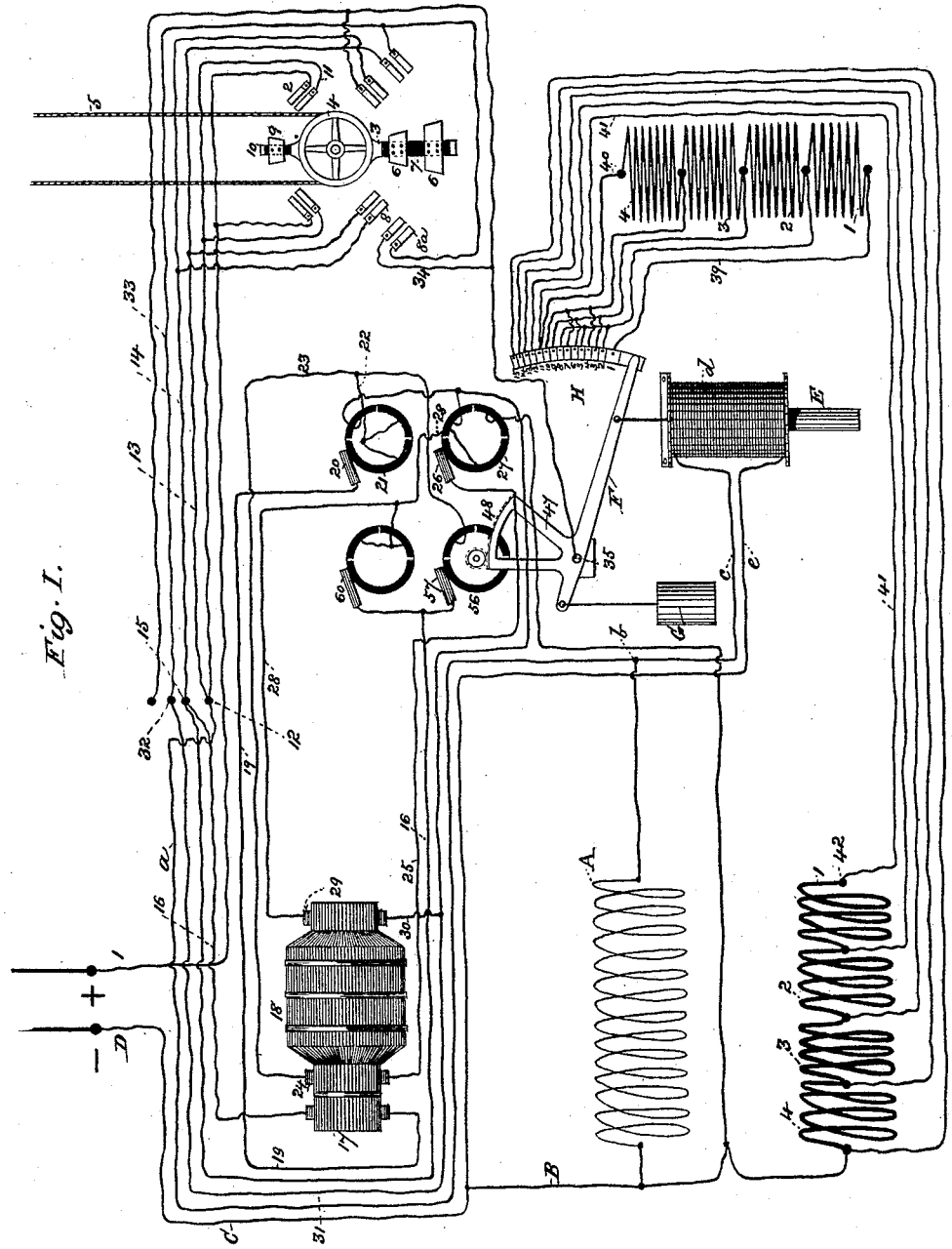
Fig. I.
WITNESSES
Edward L. Furrell
A. W. Ebersole
INVENTOR
Wendell C. Fletcher,
By Knight Bros.
attys.

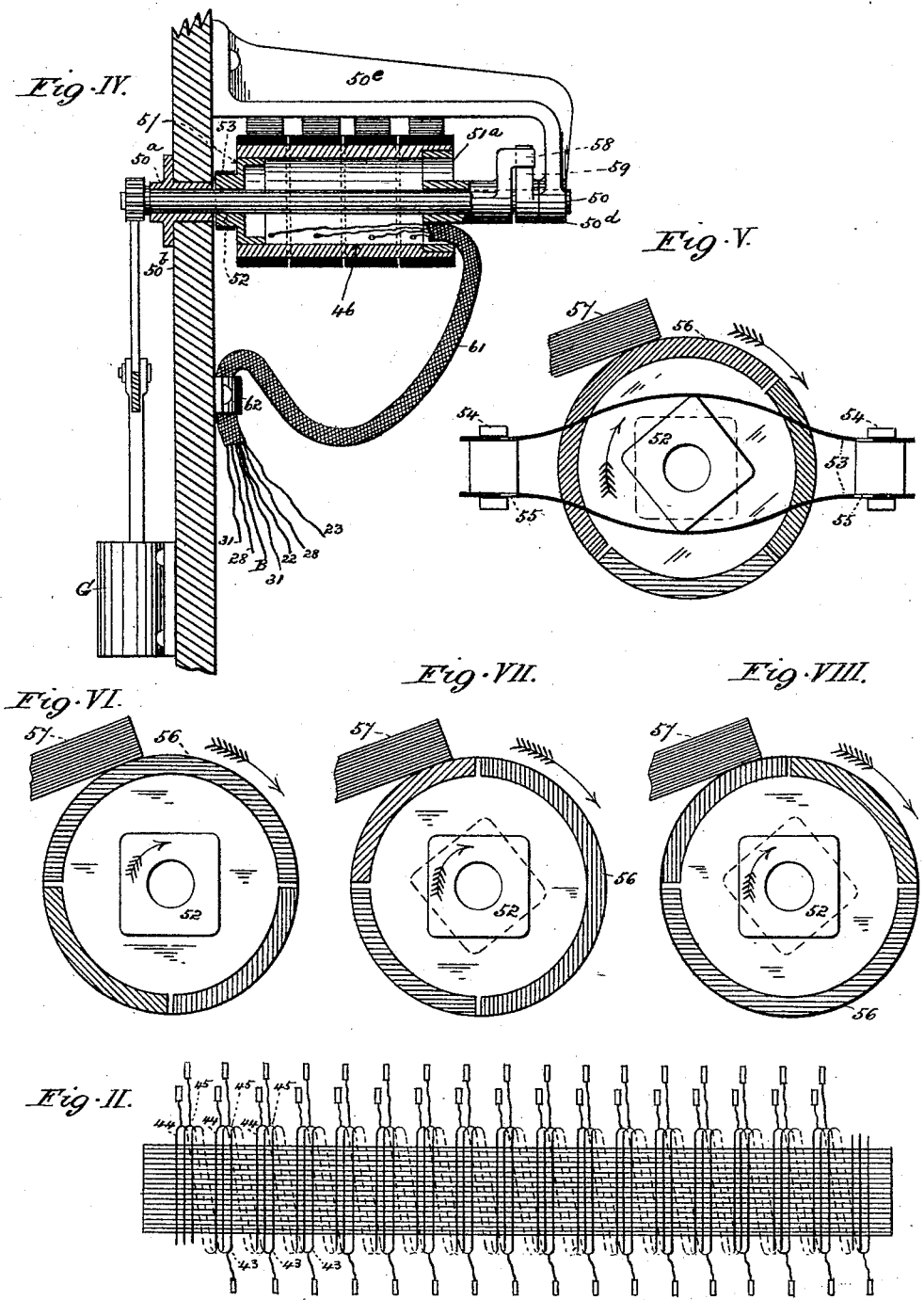

(No Model.) 4 Sheets—Sheet 3.
W. C. FLETCHER.
ELECTRIC ELEVATOR MOTOR.
No. 530,032. Patented Nov. 27, 1894.
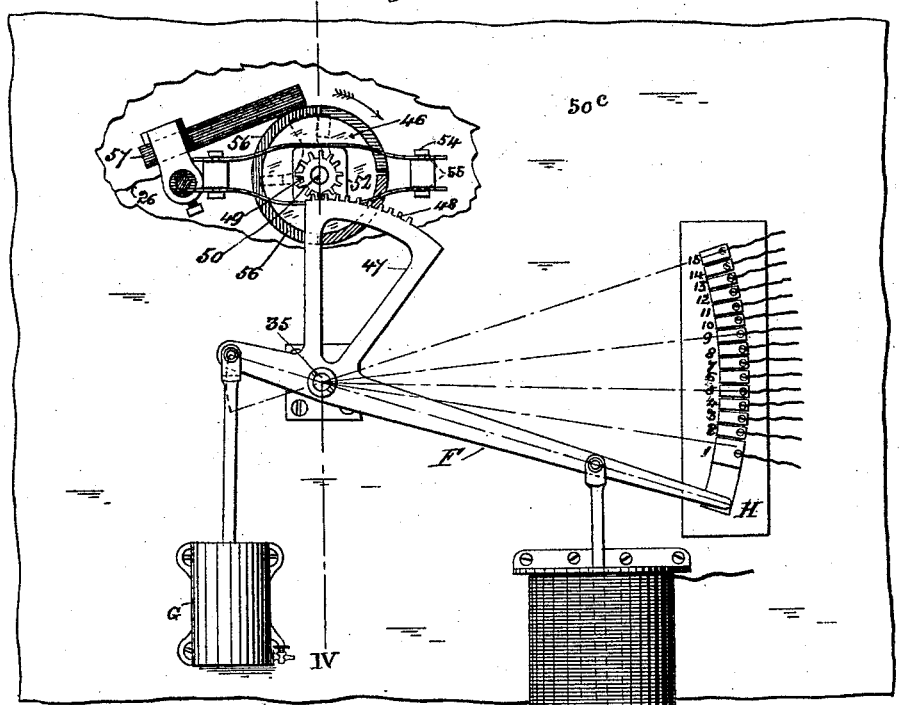
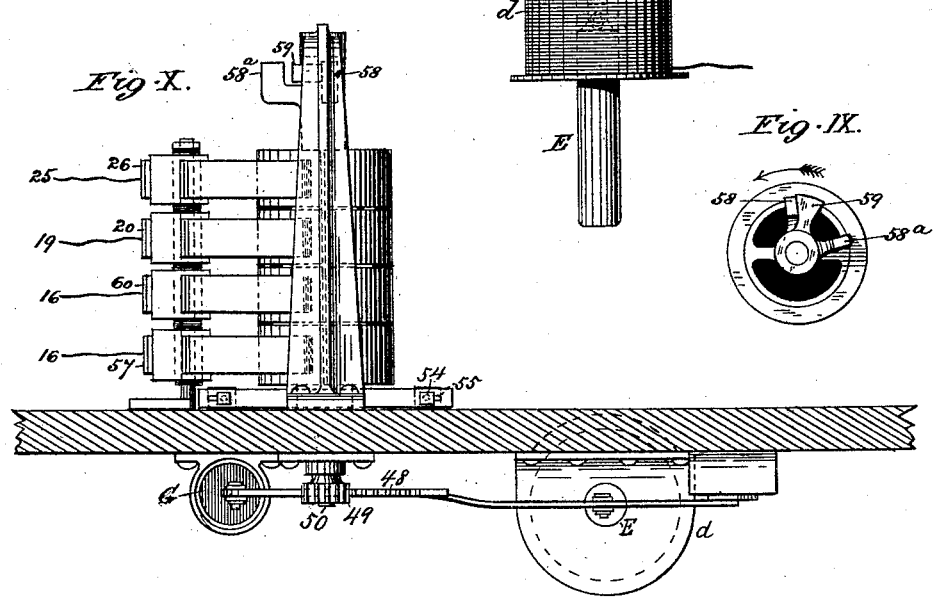
WITNESSES
Edward L. Farrell
A. W. Ebersole
INVENTOR
Wendell C. Fletcher
By Knight Bros.
attys.

(No Model.) 4 Sheets—Sheet 4.
W. C. FLETCHER.
ELECTRIC ELEVATOR MOTOR.
No. 530,032. Patented Nov. 27, 1894.
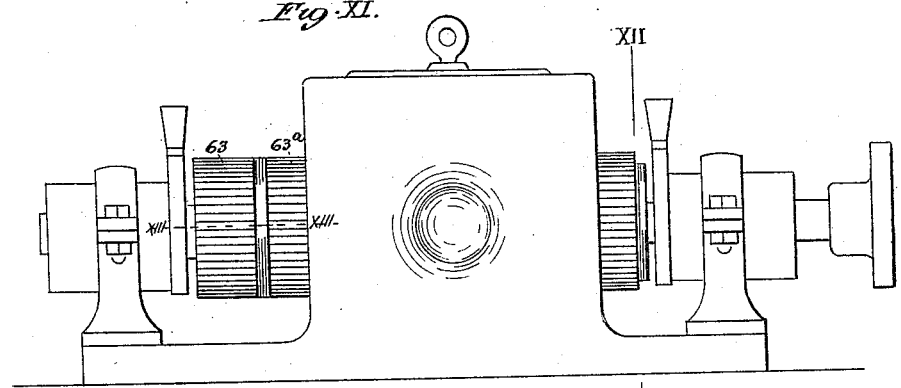
Fig. XI.
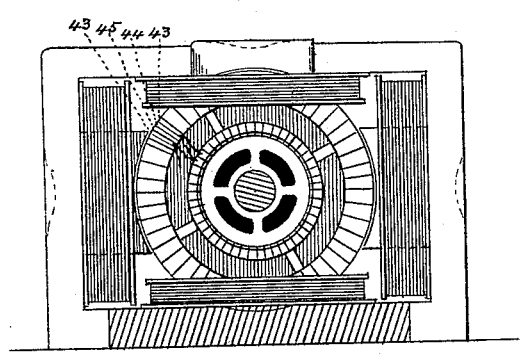
Fig. XII.
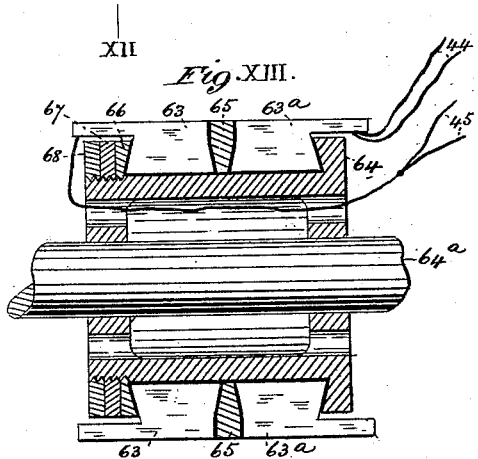
Fig. XIII.
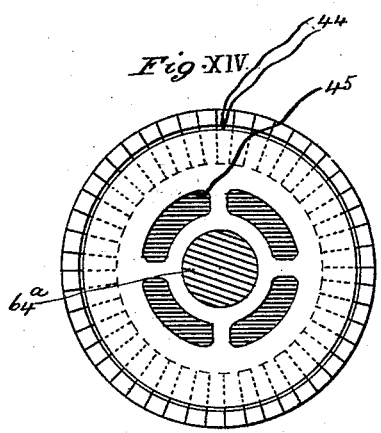
Fig. XIV.
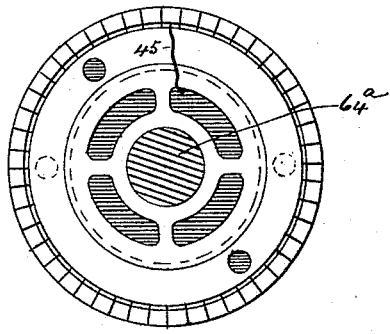
Fig. XV.
WITNESSES
Edward W. Furrell
A. M. Ebersole.
INVENTOR
Wendell C. Fletcher
By Knight Bros.
attys.

UNITED STATES PATENT OFFICE.

WENDELL C. FLETCHER, OF ST. LOUIS, MISSOURI, ASSIGNOR OF ONE-HALF TO EDWARD W. MOON, OF SAME PLACE.

ELECTRIC ELEVATOR-MOTOR.

SPECIFICATION forming part of Letters Patent No. 530,032, dated November 27, 1894.

Application filed June 14, 1894. Serial No. 514,531. (No model.)

*To all whom it may concern:*

Be it known that I, WENDELL C. FLETCHER, of the city of St. Louis, in the State of Missouri, have invented a certain new and useful Improvement in Electric Elevator-Motors, of which the following is a full, clear, and exact description, reference being had to the accompanying drawings, forming part of this specification.

My invention relates to certain improvements in electric motors and the invention has for its object the utilizing of an electric motor and means for controlling the same, which means consists in the independent multiple winding of the armature in combination with the sectional series field, which is used to strengthen the normal shunt field when first starting the motor, the effect of this combination being designed to produce a counter electro-motive force which will equal the normal when the motor has acquired but a slow speed on first starting. As the speed increases, changes are effected to constantly maintain this counter electro motive force.

My invention consists in features of novelty hereinafter fully described and pointed out in the claims.

Figure I is a view of my improved system illustrating the various parts of the system in diagram. Fig. II is a diagram illustrating the development of the winding of the armature. Fig. III is a side elevation showing the starting magnet, the switch, and the means for effecting a connection between the armature and the field, as well as various changes of the field circuit, a portion of the inclosing case being broken away to more clearly show the means of connecting and also shows the end of the armature switches. Fig. IV is a section taken on line IV—IV, Fig. III. Fig. V is an end view of the switch cylinder shown in Fig. III, in an advance position. Figs. VI, VII and VIII are views of the same in successive advanced positions. Fig. IX is an end view of the switch cylinder and shaft. Fig. X is a top view or plan of the switch. Fig. XI is a side elevation of a motor especially adapted for operating my improved system and also means for connecting the elevator or the device to be operated. Fig. XII is a sectional view taken on line XII—XII, Fig. XI. Fig. XIII is a longitudinal section taken on line XIII—XIII, Fig. XI, through a pair of commutators. Fig. XIV is a right side end view of the double commutator shown in Fig. XIII. Fig. XV is a left side end view of the double commutators.

Referring to the drawings, 1 represents the inlet wire over which the electric current passes to the contact 2, that connects with the elevator switch 3 to which is secured a pulley 4. The operating cord 5 of the elevator designed to be operated is passed over the pulley 4 which is operated in one direction when the cord is pulled, thus throwing the switch 3 either to the right or the left as the case may be, whether it is desired to ascend or descend with the elevator. In case the pulley 4 is operated by the right hand side rope, the lower end of the switch is thrown to the left, so that the plates 6 on the long arm 7 of the switch are thrown into engagement with the contacts 8 and $8^a$, and the plate 9 on the short arm 10 of the switch is thrown to the right into engagement with the contacts 2, thus forming a connection which allows the current to pass over the wire 11, up and back to a binding post 12 from which the current continues over wire $a$, down to the point $b$, where the current divides, one portion of which passes through the shunt field A, from where it passes over wire B, to a wire C, and out on the wire D. From the point $b$, where the current divides, the other portion of the current passes over a wire $c$, to the operating magnet of the starting switch $d$, through which it passes and is returned over wire $e$, back and over the wire C, and out and over the wire D. As soon as the operating cord 5 is pulled, the two circuits described are completed, and the current acting on the magnet $d$, will cause it to operate on the core E, forcing the switch arm F, which is restrained by the dash pot G, up over the contacts on the switch board H, till block 15 is reached, in which position it is maintained till the cord 5 is again pulled to cut out the circuit to stop the motor. As soon as switch arm F, reaches contact block 1, in its upward course the circuit through the armature and series field is completed. When the switch arm is on the block 1, the circuit is as follows: From positive main the current passes on wire 1 to contact 2, thence back wire 11, to binding post 12 from which it re-passes on the wire 13 back and down to the contact 8, thence up and returned on the wire 14 to the binding post 15 from which the current passes over wire 16 down and through brush 17 on the armature 18, and out and through the wire 19 to brush 20, thence through contact 21 from which it passes over wire 22, thence up and over wire 23 to brush 24 of the second armature section, through which it passes and is then carried on wire 25 and into the brush 26 on the contact 27 from which it passes on wire 28 up and over wire 28 back and through the brush 29 on the opposite end of the armature, passing through the third armature wiring, thence over the wire 30 from where it continues on 31 up to the binding post 32 and from this point the current is continued over wire 33 to the contact $8^a$, then over wire 34, which is connected at 35 to the switch arm F. The current then passes over wire 39 and through the resistance coils 1, 2, 3 and 4 and then over wire 40 to contact block 11, on the switch from which it passes over wire 41 to the terminal 42, then through the series coils, 1, 2, 3 and 4 from which it passes up and over wires B, C, and out on D.

In Fig. II I have shown the development of the armature winding which would, under the ordinary method of winding, show only the coils 43. It will be seen that the coils 44 and 45 are added to those of the ordinary system and thus an independent multiple winding is obtained, the uses of which will be hereinafter set forth.

To connect the switch arm F to the cylindrical switch 46, I form on the switch arm a segment 47 on whose upper end is provided a segment rack 48 that meshes in a pinion 49 on the outer end of the shaft 50, on which the cylindrical switch is suitably supported in bearings $50^a$ in the side wall $50^b$ of the resistance box $50^c$ and in bearing $50^d$ of the overhanging arm $50^e$.

For the purpose of causing a quick movement of the cylinder in the passage of the brushes from one set of contact segments to the next set and prevent arcing on the blocks, I provide a means for producing a rapid forward movement of the cylinder as the brushes pass from one set of segments to the next, which means I will now describe.

The cylinder is provided with spider ends 51 and $51^a$, loosely mounted on the shaft 50. On the end 51 of the spider is formed a square hub 52 on which the spring plates 53 adjustably secured by bolts 54 in slotted bearings 55, act and as the cylinder revolves, the spring plates are expanded as shown in Fig. V and as they are expanded to their outer limit the springs acting on the hub suddenly collapse as the diagonal extremities of the hub pass their outer bearings on the expanded springs and the springs attempting to assume their normal position, force the cylinder suddenly forward in its rotation one-eighth and thus the contact segment 56 has now moved forward under the brush 57 one-fourth of the cylindrical circumference or into the position shown in Fig. VI.

Figs. VII and VIII show advanced steps in the switch movement. On the hub $51^a$ are formed two arms 58 and $58^a$ which are operated by a crank arm 59 rigidly secured to the shaft 50, best shown in Fig. IX, and as the crank arm 59 revolves owing to a movement of the shaft 50 in the direction indicated by the arrows, it engages with the arm 58 and causes the cylinder to revolve in the manner previously described. The arm $58^a$ is operated on by the crank arm 59 when switch arm F moves down by gravity when the current is shut off the starting magnet $d$, by the operating rope 5, as shown in Fig. I.

The four sets of contact blocks on the cylindrical switch 46 upon which the brushes 57, 60, 20 and 26 rest, are connected from the interior of the cylinder with the cable 61, which passes out from the interior of the cylinder between the arms of the supporting spider $51^a$ from where the cable is passed down and secured to the interior wall $50^b$ of the resistance box $50^c$, by a clamp 62, thus completing the circuits through the armature switch.

Fig. XIII is a sectional view showing the arrangement of the two commutators 63 and $63^a$ shown on the left side of Fig. XI. It will be readily seen that the two commutators are mounted on a hollow sleeve 64 which is supported on the armature shaft $64^a$ by suitable hubs at each end and after the commutator $63^a$ is built up on the sleeve 64, the insulated clamping ring 65 is slipped into position on the sleeve after which the commutator 63 is likewise built up on the sleeve and the insulated clamping ring 66 is slipped on the sleeve and the nut 67 and lock nut 68 are screwed up, thereby securing the commutators on the sleeve. The wires from the armature coil 45 are passed through the hollow sleeve 64 and connected to the commutator 63 and the coupling flange 69 on the end of the motor armature shaft $64^a$ is designed to connect with a like flange on the worm shaft, not shown, of the elevator hoisting mechanism.

The system of winding and the manipulation of the switches controlling the circuits through the electric motor and the starting switch previously described is such that when the switch arm F, has reached the contact block 1 in its upward movement, the three armature circuits are in series with each other and in series with the series field and resistance coils, and as the arm F, moves up over the contact blocks 2, 3, and 4 on the switch board H, the resistance coils 1, 2, and 3 are cut out of circuit and when the switch arm F, has reached contact block 5, the second segments of the cylindrical switch 46 have moved under their respective brushes, and thus two armature circuits are in multiple series with the other armature circuit and series field, and the resistance coils 2 and 3 have been placed in circuit owing to the momentary reduction of the counter electro-motive force and the change in distribution in the armature circuits. As switch arm F passes over contacts 6, 7 and 8 it again cuts out resistance coils until the ninth contact block is reached, when the third segments on the cylindrical switch 46 will have advanced to positions under which their respective brushes, and the three armature circuits will be connected in multiple with each other, all being in series with the series field and resistance coils. As the switch arm F continues in its upward movement from contact block 9 no further movement of the cylindrical switch is made, owing to the fact that segment rack 48 has moved out of engagement with the pinion 49, and as the movement of the switch arm F, over contact blocks 10, 11 again cuts out resistance and its movement over contact blocks 12, 13, 14 and 15 gradually continues to cut out the series field till the last block is reached, where it is maintained by the magnetic action on the core by the magnet $d$. The three armature circuits in multiple with each other are now connected directly across the main line terminals and the magnetic field of the motor is now alone maintained by the action of the shunt coils.

I have shown the adaptability of my improved motor and system as applied to the operation of elevators, but it is quite obvious that they are as well adapted for operating other devices in which it is desirable to have an electric motor which will generate the full counter electro-motive force at a slow speed on first starting, thus checking the usual rush of current, and cause the motor to use current in near proportion to the load.

I claim as my invention—

1. An electric motor, a system for controlling same, said system consisting in an independently multiple wound armature, in combination with a sectional series field, and a shunt field, said combination producing a counter electro-motive force equal to the normal when first starting the motor, suitable wires and switches and means for operating them to constantly maintain the counter electro-motive force as the speed of the motor increases, substantially as set forth.

2. In an electric motor, the combination of an armature wound in independent multiple, a sectional field, a shunt field, suitable receiving and distributing wires, a throw switch for admitting the electric current to the system, a magnet, a core within the magnet, to which core a switch arm is secured, a switchboard over which the arm passes to complete the circuit, substantially as set forth.

3. In an electric motor, the combination of an armature wound in independent multiple, a sectional field, a shunt field, suitable receiving and distributing current wires, a movable switch mechanism for opening and closing the circuit to reverse the armature current, a magnet, a core within the magnet, a switch arm secured to the core, a starting switch, contact blocks on the switch, over which the arm passes, thereby equalizing the armature circuits, substantially as set forth.

4. In a mechanism for operating elevators, an electric motor having an armature wound in independent multiple, and a sectional series field to strengthen the shunt field to produce a counter electro-motive force, a movable switch for opening and closing the circuit to reverse the armature current, suitable means for operating the switch in either direction, a magnet, a core within the magnet, a starting switch-arm, contact blocks over which the arm passes producing various changes in its movement, by which the resistance coils are cut out of circuit, substantially as set forth.

5. An electric motor having an armature wound in independent multiple, and a sectional series field to produce a counter electro-motive force which will equal that of the normal speed when first starting the motor, and suitable means for constantly maintaining said counter electro-motive force, substantially as and for the purpose set forth.

WENDELL C. FLETCHER.

In presence of—
 A. M. EBERSOLE,
 E. S. KNIGHT.